Sept. 28, 1926.
O. G. MAYER
1,601,135
MACHINE FOR LINKING SAUSAGES
Filed July 29, 1925   3 Sheets-Sheet 1
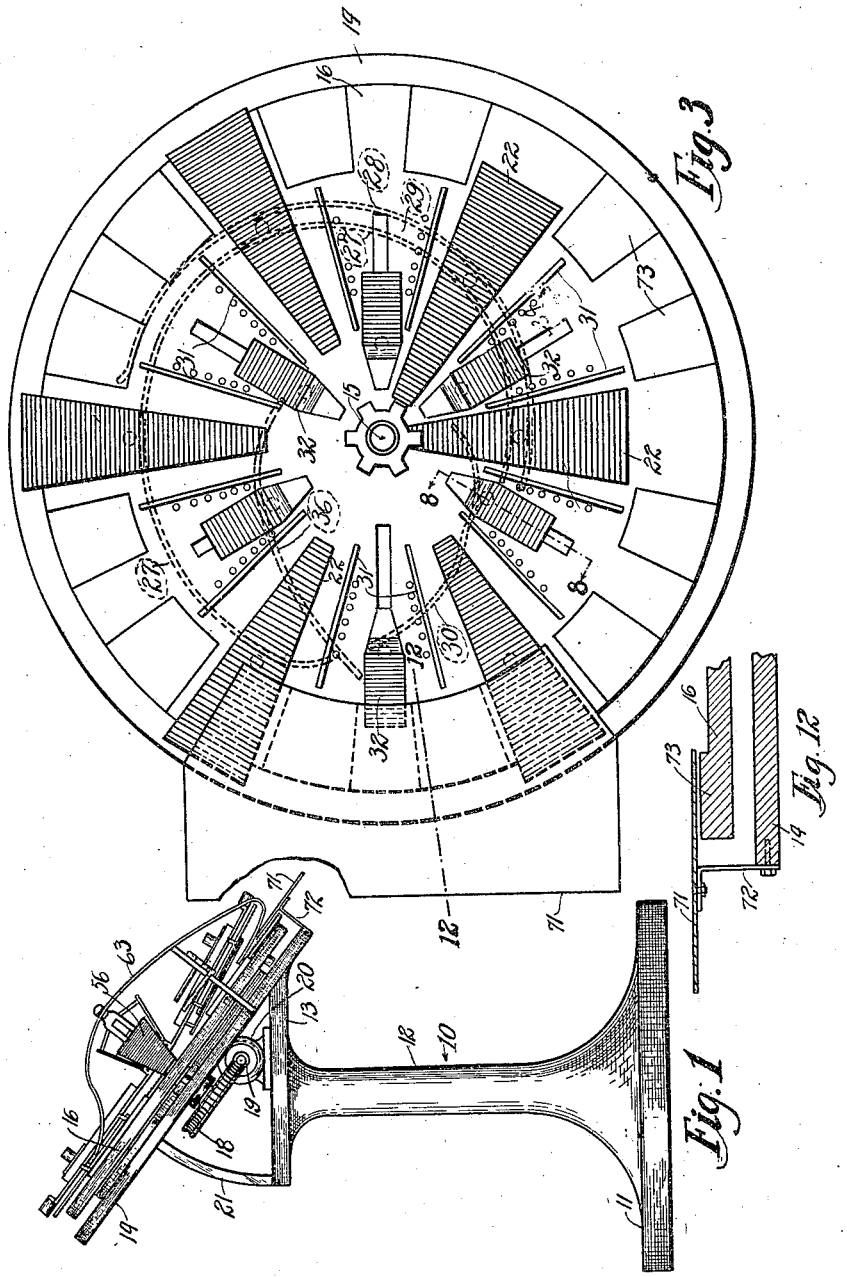
INVENTOR.
Oscar G. Mayer
BY
ATTORNEYS.

Sept. 28, 1926.
O. G. MAYER
1,601,135
MACHINE FOR LINKING SAUSAGES
Filed July 29, 1925   3 Sheets-Sheet 2
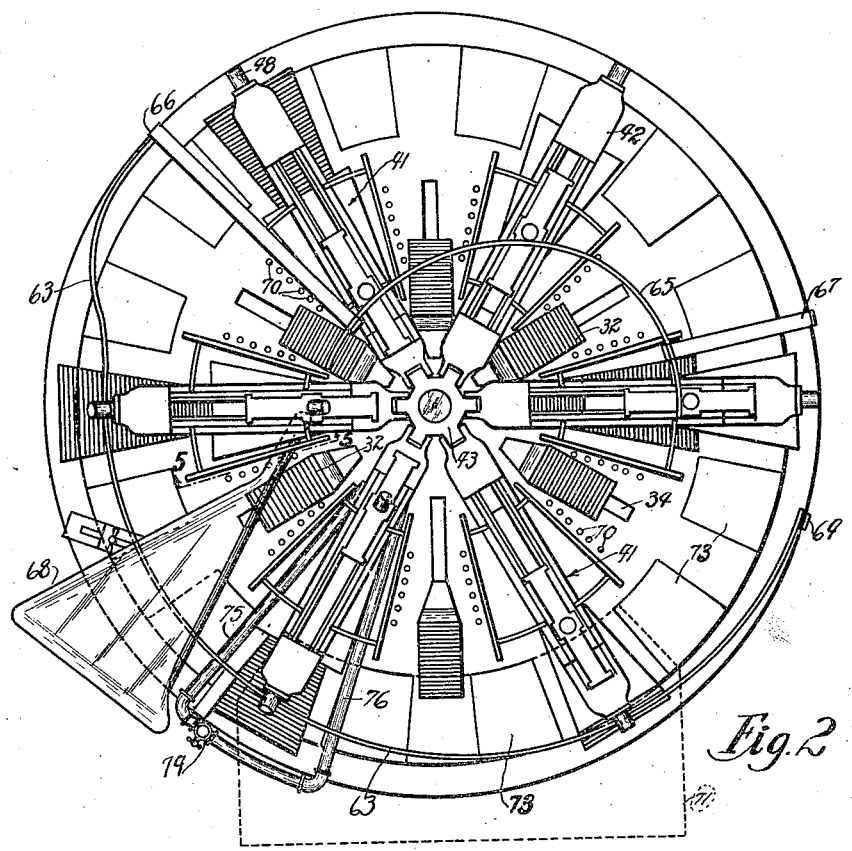
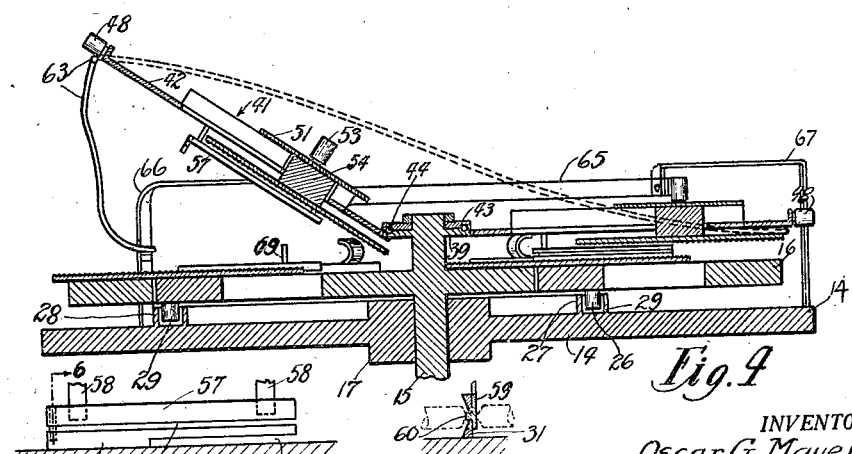
INVENTOR.
Oscar G. Mayer
BY Henry Heeh
ATTORNEYS.

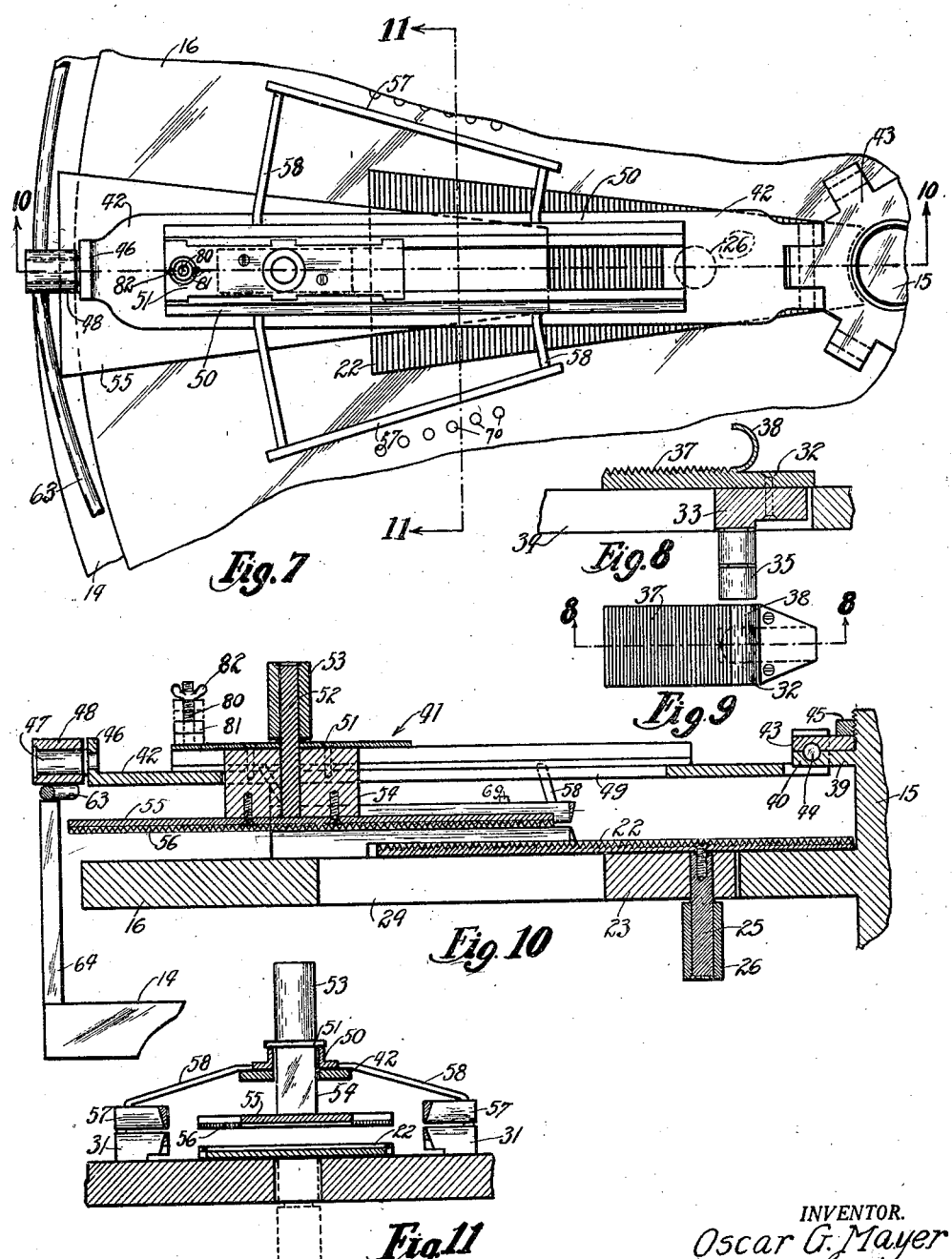

Patented Sept. 28, 1926.

1,601,135

UNITED STATES PATENT OFFICE.

OSCAR G. MAYER, OF CHICAGO, ILLINOIS.

MACHINE FOR LINKING SAUSAGES.

Application filed July 29, 1925. Serial No. 46,794.

The invention relates to machines for linking stuffed sausage casings.

The principal object of the invention aims at dispensing manual operation and consequent handling of sausage casings and to substitute therefor mechanical operation so as to meet every requirement of sanitation, exactness of linking, absence of disintegration of the sausage casing by reason of the linking process and considerable higher rate of output than hitherto possible.

A further object of the invention comprises the provision of means for varying the length of the linked sausages at will.

Another object constitutes the provision of a machine adapted to link sausages of any diameter or thickness without requiring any adjustment of the machine, so that in the course of operation varying sausage casings may be fed into the machine and subjected to the linking process without interrupting the continuity of operation.

A still further object of the invention embraces the provision of a machine in which the linking pressure is obtained by gravity of the parts carrying out the linking process enabling thereby successful linking even of extremely tender casings.

Another object constitutes the provision of friction surfaces above and below the sausage casing and reciprocating in opposite directions to cause rotation of a portion of the casing whereby the linking thereof is effected.

A still further object aims at providing means for positively actuating said friction surfaces to reliably effect linking.

Another object constitutes the provision of friction means adapted to be actuated under gravity in addition to the positive actuation.

A still further object aims at providing means for only crimping the stuffed sausage casing preparatory to linking so that no undue pressure acts on the casing whereby disintegration or tearing thereof might be caused when additional strains caused by linking are set up.

A further object constitutes the provision of the largest possible friction surfaces, by means of which linking of the casing is effected.

It is also an object of the invention to provide ejection slides capable of enhancing the linking effect of the sausage casing.

A still further object aims at providing ejecting slides operating under gravity.

Another object aims at causing the sausages to be ejected onto a surface to prevent unlinking thereof.

With these and other important objects in view which will become apparent upon a perusal of the description of the invention, the latter comprises the means described in the specification, particularly pointed out in the claims forming a part thereof, and illustrated in the accompanying drawings, in which:

Fig. 1 is an elevational view of a machine constructed in accordance with my invention;

Fig. 2 is a top plan view of the operating table;

Fig. 3 is a top plan view of the operating table, the upper structure being recurved;

Fig. 4 is a cross section through the effective part of the machine.

Fig. 5 is a detail view of the parts causing crimping of the casing, as viewed from line 5—5 of Fig. 2.

Fig. 6 is a section on the line 6—6 of Fig. 5.

Fig. 7 is an enlarged plan view of one operating unit of the machine.

Fig. 8 is a section on the line 8—8 of Fig. 3, or Fig. 9.

Fig. 9 is a top plan view of an ejector slide.

Fig. 10 is a section on the line 10—10 of Fig. 7.

Fig. 11 is a section on the line 11—11 of Fig. 7, and

Fig. 12 is a section on the line 12—12 of Fig. 3.

Referring to the drawings, 10 generally designates a pedestal comprising a base 11, an upright column 12 and a table 13 extending in horizontal direction. Upon the table 13 a platform 14 preferably through not necessarily of circular shape is mounted. The platform is supported so as to occupy a tilting position and forms an angle of approximately 40° with the horizontal. For the purpose of better illustration, the platform 14 and its associated parts are shown in Fig. 1 in operative position, whereas in the other views they are shown in horizontal position. A shaft 15 extends vertically through the platform and is formed integrally with or has secured thereto a work table 16 which is supported by a hub 17 formed at the center of the platform 14.

A worm wheel 18 (Fig. 1) at the lower end of shaft 15 meshes with a worm 19 on the shaft of a motor 20 arranged on the platform 13. Attention is called to the fact that the drive to the shaft 15 may be imparted in any other preferred or suitable manner and the particular arrangement described is selected for the purpose of explaining one mode of execution.

The platform 14 at one side is supported directly on the table 13 and its opposite side rests on a bracket 21 to which it is secured in any appropriate or approved manner.

On the table are slidably arranged a plurality of friction plates 22 in the form of a trapeze but any other form may be selected with a view of obtaining a maximum friction surface. The plates 22 comprise a body portion of any suitable material and have secured thereto rubber matting or other corrugated material adapted to frictionally engage the sausage casing as will be hereinafter further explained. The plates are secured to a block 23 (Fig. 10) slidable in a slot 24 provided in the table 16 and a stem 25 extends through the block from the friction plate and has as its lower free end a roller 26 which is guided by a cam 27 (Fig. 3) forming an almost closed curve and cooperating with another cam 28 of approximately semi-circular shape to provide a camway 29.

A cam 30 bridges the gap formed by the ends of cam 27 so as to maintain the friction plates sufficiently spaced from the center of the table so that the rollers in the course of rotation of said table will engage the outer face of cam 27. The cams are secured to the platform 14.

From the foregoing follows that upon starting of the motor 20 rotation is imparted to the shaft 15 and therewith to the table 16. The cam 27 causes reciprocation of the rollers 26 and therewith of the friction plates, as will be readily understood upon reference to Figs. 3 and 4.

In the embodiment shown in the drawings six friction plates are provided but a lesser or greater number may be employed if so desired, depending on the size of the machine, and the length of the sausages to be linked.

A plurality of radial bars 31 are mounted on the table symmetrically arranged with respect to the longitudinal axis of the friction plates.

Between co-operating bars 31 are ejector plates 32 which are slidably mounted on the table and are secured to a block 33 (Fig. 8) adapted to slide in a slot 34 provided in the table 16.

A roller 35 is secured to the underside of said block and is controlled by a cam 36 also provided on the platform 14.

The ejector plate 32 has a corrugated surface 37 and intermediate its ends is formed with a hook 38 by means of which the sausage casing after linking is ejected, as will hereinafter further appear.

The shaft 15 is formed with an annular member 39 formed with extension lugs 40. To each lug 40 is hingedly secured a clamping or crimping member generally designated by 41. Each clamping member comprises a plate 42 bifurcated at the inner end to receive between the prongs thus formed the lug 40. A ring 43 of the same shape as member 39 covers the latter and both parts have semi-circular grooves complementing each other to form a hole to receive a hinge pintle 44. A washer 45 is threaded onto the upper end of the shaft 15 and forces the ring 43 against the member 39 to hold the parts together. The outer end of the plate 42 has an upright flange 46 to which is secured a horizontal stem 47 carrying a roller 48.

The plate 42 has an elongated slot 49, and guide members 50 (Fig. 11) in the form of angle irons are mounted on the plate 42 with the vertical legs flush with the longitudinal edges of the slot. A slide 51 is adapted to reciprocate on the members. A vertical stem 52 (Fig. 10) projects through said slide carrying at the upper protruding end a roller 53 and extending with the lower end into a block 54. To the lower face of block a plate 55 is secured which is equipped with a corrugated surface 56 such as rubber matting or the like.

To the plate 42 a pair of bars are secured by arms 58. The bars 57 are positioned to coincide with the bars 31 of the work table 16.

Referring particularly to Figs. 5 and 6, it will be seen that at the outer ends of bars 31 a member 59 is secured which has a lug 60 over the edge of bar 31 preventing thereby the bars 57 to completely engage the edges of bars 31 leaving thereby a clearance 61. When as will be hereinafter further explained the bars 57 are lowered the sausage casing resting on the bars 31 will not be pinched or clamped but merely crimped obviating thereby the possibility that even tender casings are torn. This is of great importance especially where the machine is operated to obtain a high rate of output.

Attention is called to the fact that the bars 31 are provided with cut out portions 62 (Fig. 5) at the lower ends so that considerably broader friction plates 22 than those shown in Fig. 3 may be utilized and are free to reciprocate as the cut out portions 62 clear the inner ends of said friction plates.

As indicated in the drawings the roller 48 of the crimping member 41 is controlled during a portion of its rotation around the center of the machine by a ramp rod 63. The latter originates from the periphery of the platform 14, ascends to a certain height and descends again. The ramp rod substantially follows the periphery of the platform and extends through a semi-circle. It is held in position by a plurality of up-rights 64.

The roller 53 during the rotation of the work table engages the outer side of a cam 65 supported by brackets 66 and 67 from the platform 14.

A chute 68 (Fig. 2) affords means for introducing the stuffed sausage casing into the machine. The sausage casing is arranged to abut pins 69 there being a series of apertures 70 provided in the table 16 near each bar 31 so that the pins 69 may be arranged selectively in said apertures in accordance with the desired length of the sausages to be linked. In other words, if the pins 69 are set in apertures adjacent to the shaft 15, the casing abutting said pins will be linked to yield shorter sausages than if the pins are remote from the shaft.

The operation of the machine is as follows: Upon starting of the motor 20, rotation is imparted to the table 16 and the friction plates 22 are reciprocated toward the center as will be understood by reference to Fig. 3. The members 41 are lifted by the ramp rod 62 into idle position and are subsequently lowered so as to obtain co-operation between the bars 31 and 57 to effect crimping of the casing.

At the same time, the cam 65 engages the roller 53 and causes reciprocation of the upper friction plates 55 toward the periphery. The sausage casing situated between the upper and the lower friction plate subsequently to being crimped is thus revolved around its axis and accordingly linked.

In the continued rotation of the work table 16 the ejector plates are forced toward the periphery by reason of the engagement of their rollers 35 and cam element 30, so that the ejector hooks 38 engaging the sausages force the same onto a discharge plate 71 which is parallel to the work table and extends slightly over the same as will appear by referring to Fig. 12. Brackets 72 from the platform 14 are secured to the plate 71 to hold the same in position. The work table 16 is provided with enlarged portions 73 to fill the gap between the work table and the discharge plate so that in the course of operation the sausages cannot get caught between the discharge plate and the table.

The inclination of the table 16 entails many advantages for the successful operation of the machine. The ejectors discharge under gravity and a gravity discharge of the sausages onto the plate 71 are obtained. Furthermore, the lower friction plates 22 resume their original position under gravity and the upper friction plates 56 are brought in like manner in the functional position. It is also noteworthy that the crimping head 41 is active under its weight in descending and holding the sausage casing in position while the friction plates effect revolution of the casing. The friction plates while co-operating in the linking process still are independently controlled.

To obtain smooth operation a flushing system is provided which comprises a riser 74 from which branch sprinkle pipes 75 and 76 adapted to flush the work table and the crimping head so as to insure sanitary condition and facilitate operation.

It is furthermore noteworthy that the means for acting on the stuffed sausage casing have been designed with the particular object of meeting the requirement of avoiding tearing of the casing. To this end the clamping head 41 is provided with means for adjusting its weight. As shown in Fig. 10, the plate 51 has an upstanding rod 80 on which may be arranged a plurality of weights 81 and these weights may be held by a wing nut 82 to prevent rattling thereof during the operation of the machine. In the case of tender sausage casings, only one weight 81 is employed to afford the necessary pressure in obtaining rotation of the sausage casing. For casings of comparatively large diameter additional weights are employed.

The friction plate 55 and the plate 51 constitute a floating member with respect to the plate 42, which is self-adjusting and capable of adapting itself to various casing diameters. The plate 51 is rather extended and either end may form a fulcrum permitting slightly tilted position of the friction plate 56 in acting on large diameter casings.

When starting operation the front end of the sausage casing has secured thereto a clamp or similar member adapted to be seized by the clamping head adjacent to the chute 68. The casing is then carried along by that particular clamping head and that portion of the casing which lies under the succeeding clamping head is revolved, it being understood that the casing is revolved only at alternate sections to effect linking.

Another advantage which distinguishes my machine is the fact that all parts are easily accessible and removable. Thus as previously stated, the clamping heads may be removed by releasing the washer 45. The lower friction plates 22 and the ejector plates 32 may be removed by simply lifting the same out from the table 16.

Of great importance is furthermore the ease with which the length of the sausage may be varied. This is effected by the adjustment of the pins 69 and the delivery of the sausage casings by the chute 68 onto the pins.

In the foregoing a preferred embodiment of the invention has been described to demonstrate one way of reducing the principle of the invention to practice. Particular stress is laid on the general arrangement of the sloping work table whereby most steps of the operations are effected under gravity. The positive action of linking the sausage casing without setting up any strains on the tender skins to obviate tearing or disintegration of the casing is a notable feature of the invention. The various other advantageous objects have been referred to and contribute to the successful and reliable operation of the machine at considerable speed. The reference in the claims and specification to a sausage casing, is directed to a stuffed casing, as of course, will be readily understood by those versed in the art.

The detailed description of the machine as already stated, merely explains one embodiment of the invention. Numerous changes, alterations, variations and reorganization of parts may be made within the purview of the invention. I therefore do not limit myself to the details as shown but claim my invention as broadly as the state of the art permits.

I claim:

1. In a machine of the class described, gravity actuated means for engaging a sausage casing at remote points, and means for revolving the casing between points of engagement.

2. In a machine of the class described, gravity actuated means for crimping a sausage casing at remote points, and means for revolving the casing between points of engagement.

3. In a machine of the class described, reciprocating means for revolving a sausage casing around its longitudinal axis.

4. In a machine of the class described, reciprocating friction means for revolving a sausage casing around its longitudinal axis.

5. In a machine of the class described, a plurality of independently moving reciprocating members adapted to revolve a sausage casing around its longitudinal axis.

6. In a machine of the class described, reciprocating means acting under gravity for revolving said sausage casing around its longitudinal axis.

7. In a machine of the class described, reciprocating friction means acting under gravity to revolve a sausage casing around its longitudinal axis.

8. In a machine of the class described, a plurality of members adapted to revolve a sausage casing around its longitudinal axis, and gravity means for actuating certain of said members.

9. In a machine of the class described, a plurality of members reciprocating in opposite directions for revolving a sausage casing around its longitudinal axis.

10. In a machine of the class described, a plurality of friction members reciprocating in opposite directions for revolving a sausage casing around its longitudinal axis.

11. In a machine of the class described, means for engaging a sausage casing at distant points, and reciprocating means for revolving the sausage casing around its longitudinal axis between said points.

12. In a machine of the class described, means for engaging a sausage casing at separate points, and reciprocating friction means for revolving the sausage casing around its longitudinal axis, between said points.

13. In a machine of the class described, means for engaging a sausage casing at separate points, a plurality of reciprocating members adapted to revolve a sausage casing around its longitudinal axis between said points, and gravity means for actuating certain of said members.

14. In a machine of the class described, means for engaging a sausage casing at separate points, and a plurality of members reciprocating in opposite directions for revolving a sausage casing around its longitudinal axis between said points.

15. In a machine of the class described, means for engaging a sausage casing at separate points, and a plurality of friction members reciprocating in opposite directions for revolving a sausage casing around its longitudinal axis.

16. In a machine of the class described, means for engaging a sausage casing at separate points, and friction members reciprocating in parallel planes for revolving the casing around its axis between said points.

17. In a machine of the class described, means for engaging a sausage casing at separate points, and friction members reciprocating in parallel planes but in opposite directions for revolving the casing around its axis between said points.

18. In a machine of the class described, means for engaging a sausage casing at distant points, a plurality of members for revolving the sausage casing around its axis between said points, certain of said members being gravity actuated and means for independently controlling the other members.

19. In a machine of the class described, means for engaging a sausage casing at distant points, a plurality of reciprocating members for revolving the sausage casing around its axis between said points, and means for controlling said members.

20. In a machine of the class described, means for engaging a sausage casing at distant points, a plurality of independent members for revolving the sausage casing around its axis between said points, certain of said members being gravity actuated and means for controlling the other members.

21. In a machine of the class described, means for engaging said sausage casing at distant points, a plurality of independent reciprocating members for revolving the sausage casing around its axis between said points, and means for controlling said members.

22. In a machine of the class described, means for engaging a sausage casing at distant points, a plurality of members for revolving the sausage casing around its axis between said points, and cams for controlling said members.

23. A device for linking sausages, including means moving in a devious path for engaging a sausage casing at spaced points, and means on said first named means for revolving the sausage casing around its axis between said points.

24. A device for linking sausages including means moving in a devious path for engaging a sausage casing at spaced points, and means carried by said first named means and moving in a rectilinear path for revolving the sausage casing around its axis between said points.

25. A device for linking sausages, including means for engaging a sausage casing at spaced points, means carried by said first named means and moving in a rectilinear path for revolving the sausage casing around its axis between said points, and means for controlling said first named means.

26. A device for linking sausages, including means for engaging a sausage casing at spaced points, means carried by said first named means and moving in a rectilinear path for revolving the sausage casing around its axis between said points, and a cam for controlling said first named means.

27. A device for linking sausages, including gravity means moving in a devious path and subsequently in a rectilinear path for engaging a sausage casing at spaced points and means carried thereby for revolving the sausage casing around its axis between said points.

28. A device for linking sausages, including pivotal means for engaging a sausage casing at spaced points and means rendered active by said first named means for revolving the sausage casing around its axis between said points.

29. A device for linking sausages, including means for engaging a sausage casing at spaced points, and means reciprocating on said first named means for revolving the sausage casing around its axis between said points.

30. A device for linking sausages, including means for engaging a sausage casing at spaced points and means slidably carried by said first named means for revolving the sausage casing around its axis between said points.

31. A device for linking sausages, including means for engaging a sausage casing at spaced points, and reciprocating means rendered active by the functional position of said first named means for revolving the sausage casing around its axis between said points.

32. In a machine of the class described, gravity actuated means for crimping a sausage casing at spaced points, and cam controlled means for revolving the sausage casing around its axis between said points.

33. In a machine of the class described, means for crimping a sausage casing at spaced points, and a plurality of reciprocating members for revolving the sausage casing around its axis between said points, and cams for controlling said members.

34. In a machine of the class described, a rotary support, means for crimping a sausage casing at spaced points on said support, a plurality of reciprocating members carried by said support for revolving the sausage casing around its axis between said points.

35. In a machine of the class described, a rotary support, means for crimping a sausage casing at spaced points on said support, a plurality of members carried by said support for revolving the sausage casing, and means for reciprocating said members.

36. In a machine of the class described, a rotary support, means on said support for crimping a sausage casing at spaced points, a plurality of members carried by said support for revolving the sausage casing, and cams for reciprocating said members in opposite direction.

37. In a machine of the class described, a rotary support, means on said support for crimping a sausage casing at spaced points, a plurality of members carried by said support for revolving the sausage casing, and stationary means for reciprocating said members in opposite directions.

38. In a machine of the class described, means for crimping a sausage casing at spaced points, means for revolving the sausage casing around its axis between said points, and reciprocating means for ejecting the linked sausages.

39. In a machine of the class described, means for crimping a sausage casing at spaced points, means for revolving the sausage casing around its axis between said points, and members reciprocating under gravity for ejecting the sausages and preventing unlinking thereof.

40. A machine of the class described, including a rotary support, bars on said support, means carried by said support and co-operating with said bars to effect crimping of the sausage casing under gravity, and means for revolving the crimped casing.

41. A machine of the class described, including a rotary support, bars on said support, means carried by said support and co-operating with said bars for crimping said sausage casing, a plurality of members for revolving the casing between crimpings, one of said members being mounted on said means, and means for actuating said members.

42. A machine of the class described, including a rotary support, bars on said support, gravity actuated means carried by said support and co-operating with said bars for crimping a sausage casing, a plurality of members for revolving the casing, one of said members being mounted on said means and acting under gravity, and means for actuating the other of said members.

43. A machine of the class described, including means for crimping a sausage casing at spaced points, and means slidable on said first named means for revolving the casing between said points.

44. A machine of the class described, including gravity means for crimping a sausage casing at spaced points, and means slidable on said first named means and rendered active by the functional position of the latter for revolving the casing between said points.

45. In a machine of the class described, radially extending means for crimping a sausage casing, and means for varying the position of the sausage casing to change the length of the sausages to be linked.

46. In a machine of the class described, a rotary support, radially extending means thereon for crimping a sausage casing, and means adjustable in radial direction to vary the distance of the casing from the center of said support.

47. In a machine of the class described, a rotary support, radially extending means thereon for crimping a sausage casing and adjustable abutment means for the casing permitting variation of the distance of the casing from the center of said support.

48. In a machine of the class described, a rotary support, radially extending means thereon for crimping a sausage casing, adjustable abutment means, and means for placing the sausage casing to be linked against said abutment means.

49. In a machine of the class described, a rotary support, radially extending means thereon for crimping a sausage casing, adjustable abutment means, and a chute delivering the sausage casing to be linked against said abutment means.

50. In a machine of the class described, a rotary support, radially extending means thereon for crimping a sausage casing, abutment means adjustable in radial direction, and a chute placing the sausage casing to be linked against said abutment means.

51. A machine of the class described, including means for crimping a sausage casing at spaced points, and means loosely carried by said first named means for revolving the casing between said points.

52. A machine of the class described, including means for crimping a sausage casing at spaced points, and a floating member carried by said crimping means, and adapted to revolve the casing between said points.

53. A machine of the class described, including a lever pivotally supported at one end and adapted to crimp a sausage casing at spaced points, and a floating member carried by said lever adapted to revolve the sausage casing between said points.

54. A machine of the class described, including a lever pivotally supported at one end and adapted to crimp a sausage casing at spaced points, and a floating member carried by said lever and adapted to revolve the sausage casing between said points, said member being tiltable at both ends on said lever to adapt itself to varying diameters of sausage casings.

55. A machine of the class described, including gravity actuated means for crimping a sausage casing at spaced points, and means for varying the weight of said means in accordance with the degree of tenderness of the sausage casing.

56. A machine of the class described, including gravity actuated means for crimping a sausage casing at spaced points, means for varying the weight of said means to change the pressure on the casing to be operated on, and means for controlling the operation of said first named means.

57. A machine of the class described, including gravity actuated means for crimping a sausage casing, and means for increasing the potential energy of said crimping means by lifting the same and thereby releasing a previously crimped casing.

58. A machine of the class described, including a rotary support, levers thereon for crimping a sausage casing at spaced points, a ramp rod actuating said levers, floating members on said levers for revolving the sausage casing between said points, and friction members co-operating with said floating members.

59. A machine of the class described, including a rotary support, radially extending levers on said support for crimping a sausage casing at spaced points, stationary means for actuating said levers to engage the casing and release the same, respectively floating members on said levers for revolving the casing between said points, and friction members co-operating with said floating members.

60. A machine of the class described, including a rotary support, radially extending levers on said support for crimping a sausage casing at spaced points, stationary means for actuating said levers to engage the casing and release the same, respectively floating members on said levers for revolving the casing between said points, friction members co-operating with said floating members, and ejector members for discharging the linked sausages.

61. A machine of the class described, including a rotary support, radially extending levers on said support for crimping a sausage casing at spaced points, stationary means for actuating said levers to engage the casing and release the same, respectively, floating members on said levers for revolving the casing between said points, friction members co-operating with said floating members, and ejector members for discharging the linked sausages, said friction members and said ejector members being removable by being lifted from the machine.

62. A machine of the class described, including a rotary support, radially extending levers on said support, for crimping a sausage casing at spaced points, stationary means for actuating said levers to engage the casing and release the same, respectively, floating members on said levers, friction members co-operating with said floating members for revolving the casing between said points, and ejector members for discharging the linked sausages, said friction members and said ejector members being actuated under gravity.

In witness whereof I affix my signature.

OSCAR G. MAYER.